(12) United States Patent
Suwabe et al.

(10) Patent No.: US 9,890,085 B2
(45) Date of Patent: Feb. 13, 2018

(54) CERAMIC HONEYCOMB STRUCTURE AND ITS PRODUCTION METHOD

(75) Inventors: Hirohisa Suwabe, Shimotsuke (JP); Masaru Yoshida, Moka (JP); Tomomasa Kumagai, Miyako-gun (JP)

(73) Assignee: HITACHI METALS, LTD., Minatu-ku, Tokyo (JP)

( * ) Notice: Subject to any disclaimer, the term of this patent is extended or adjusted under 35 U.S.C. 154(b) by 1057 days.

(21) Appl. No.: 12/680,556

(22) PCT Filed: Sep. 19, 2008

(86) PCT No.: PCT/JP2008/067030
§ 371 (c)(1),
(2), (4) Date: Mar. 26, 2010

(87) PCT Pub. No.: WO2009/041369
PCT Pub. Date: Apr. 2, 2009

(65) Prior Publication Data
US 2010/0233425 A1    Sep. 16, 2010

(30) Foreign Application Priority Data

Sep. 27, 2007   (JP) ................................. 2007-251177

(51) Int. Cl.
*B32B 3/12* (2006.01)
*C04B 35/00* (2006.01)
(Continued)

(52) U.S. Cl.
CPC ...... *C04B 35/478* (2013.01); *C04B 35/62665* (2013.01); *C04B 38/0006* (2013.01);
(Continued)

(58) Field of Classification Search
CPC .. C04B 38/0006; C04B 35/478; C04B 35/185
(Continued)

(56) References Cited

U.S. PATENT DOCUMENTS 4,483,944 A * 11/1984 Day et al. .................. 502/439
5,290,739 A *  3/1994 Hickman .................... 501/128
(Continued)

FOREIGN PATENT DOCUMENTS

JP        06-040766 A      2/1994
JP        11-114336 A      4/1999
(Continued)

OTHER PUBLICATIONS

European Search Report issued in Application No. 08834018.7 dated Jul. 22, 2011.

*Primary Examiner* — Humera Sheikh
*Assistant Examiner* — Xiaobei Wang
(74) *Attorney, Agent, or Firm* — Sughrue Mion, PLLC

(57) ABSTRACT

A honeycomb structure having crystal phases of aluminum titanate and mullite, which is obtained by sintering a honeycomb molding made of a mixture comprising titania powder, alumina powder, silica powder and mullite powder, the mixture containing 1-10 parts by mass of silica powder and 5-30 parts by mass of mullite powder per the total amount (100 parts by mass) of the titania powder and the alumina powder, and the mullite powder containing 40-60% by mass of particles having particle sizes of 10-50 gm and 5-30% by mass of particles having particle sizes of 3 gm or less, and its production method.

6 Claims, 2 Drawing Sheets

(51) Int. Cl.
  *C03C 10/14* (2006.01)
  *F27B 14/00* (2006.01)
  *C04B 35/478* (2006.01)
  *C04B 35/626* (2006.01)
  *C04B 38/00* (2006.01)
  *C04B 111/00* (2006.01)

(52) U.S. Cl.
  CPC ............ *C04B 2111/00793* (2013.01); *C04B 2235/3418* (2013.01); *C04B 2235/3463* (2013.01); *C04B 2235/5436* (2013.01); *C04B 2235/5445* (2013.01); *C04B 2235/5472* (2013.01); *Y10T 428/24149* (2015.01)

(58) Field of Classification Search
  USPC ............................................ 428/116; 432/13
  See application file for complete search history.

(56) References Cited

U.S. PATENT DOCUMENTS

| | | | |
|---|---|---|---|
| 6,773,481 B2* | 8/2004 | Noguchi et al. | 55/523 |
| 6,849,181 B2 | 2/2005 | Ogunwumi et al. | |
| 7,001,861 B2 | 2/2006 | Beall et al. | |
| 2004/0020846 A1* | 2/2004 | Ogunwumi et al. | 210/510.1 |
| 2005/0227869 A1* | 10/2005 | Ohno et al. | 502/439 |
| 2007/0063398 A1 | 3/2007 | Takahashi | |
| 2009/0092786 A1* | 4/2009 | Liu et al. | 428/116 |
| 2011/0265439 A1* | 11/2011 | Saito et al. | 55/523 |

FOREIGN PATENT DOCUMENTS

| | | |
|---|---|---|
| JP | 2005-534474 A | 11/2005 |
| JP | 2005-534597 A | 11/2005 |
| JP | 2007-076984 A | 3/2007 |

* cited by examiner

CERAMIC HONEYCOMB STRUCTURE AND ITS PRODUCTION METHOD

CROSS REFERENCE TO RELATED APPLICATIONS

This application is a National Stage of International Application No. PCT/JP2008/067030 filed Sep. 19, 2008, claiming priority based on Japanese Patent Application No. 2007-251177, filed Sep. 27, 2007, the contents of all of which are incorporated herein by reference in their entirety.

FIELD OF THE INVENTION

The present invention relates to a ceramic honeycomb structure used for ceramic honeycomb filters for cleaning particulate-matter-containing exhaust gases discharged from diesel engines, etc.

BACKGROUND OF THE INVENTION

Exhaust gases from diesel engines contain particulate matter (PM) based on carbonaceous soot and SOFs (soluble organic fractions) of high-boiling-point hydrocarbons, and the release of PM into the atmosphere is likely to exert adverse effects on humans and environment. Exhaust pipes connected to diesel engines are thus conventionally provided with ceramic honeycomb filters (simply called "honeycomb filters" below) for capturing PM.

FIGS. 1(a) and 1(b) show one example of honeycomb filters for capturing PM to clean the exhaust gas. A honeycomb filter 10 comprises a ceramic honeycomb structure having porous cell walls 2 for constituting large numbers of outlet-side-sealed flow paths 3 and inlet-side-sealed flow paths 4 and a peripheral wall 1, and upstream-side plugs 6a and downstream-side plugs 6c for sealing the exhaust-gas-inlet-side end surface 8 and exhaust-gas-outlet-side end surface 9 of the outlet-side-sealed flow paths 3 and inlet-side-sealed flow paths 4 alternately in a checkerboard pattern. The honeycomb filter is stationarily disposed in a metal container (not shown), with its peripheral wall 1 gripped by holding members (not shown) constituted by a metal mesh, a ceramic mat, etc.

An exhaust gas is cleaned by the honeycomb filter 10 as follows. As shown by dotted lines, the exhaust gas flows into the outlet-side-sealed flow paths 3 open on the exhaust-gas-inlet-side end surface 8, and while passing through the cell walls 2, specifically while passing through pores communicating on and in the cell walls 2, PM contained in the exhaust gas is captured. The cleaned exhaust gas is discharged from the inlet-side-sealed flow paths 4 open on the exhaust-gas-outlet-side end surface 9 to the air.

The honeycomb filter is required to have high PM-capturing efficiency and small pressure loss. To meet these requirements, the cell walls have proper porosity, and most cell walls have porosity of about 50-65%. Presently available honeycomb structures for constituting the honeycomb filters are mainly made of cordierite.

The honeycomb filter should have such heat resistance that it is not destroyed or melted by high heat generated when the captured PM is burnt. To meet such requirement, aluminum-titanate-based honeycomb filters having similar thermal expansion coefficients to and higher melting points than those of cordierite have been finding practical applications in place of cordierite-based honeycomb filters.

The low thermal expansion of aluminum titanate appears to be due to microcracks existing in its sintered bodies. More microcracks provide smaller thermal expansion coefficients, though providing sintered bodies with lower strength. Further, because of relatively large sintering shrinkage, aluminum titanate is likely to suffer sintering cracking.

JP 6-40766 A discloses an aluminum-titanate-based ceramic comprising aluminum titanate as a matrix and mullite or a mullite cordierite composite, which has high strength and a low thermal expansion. Its Examples show ceramics having thermal expansion coefficients of about $1.9\text{-}6.1 \times 10^{-6}/°C$.

Although such thermal expansion coefficient of this ceramic may be sufficient for insulators for engines, it is insufficient for large honeycomb structures having outer diameters of 100 mm or more and lengths of 150 mm or more for PM-removing filters for diesel engines.

JP 2005-534597 A discloses an aluminum-titanate-based ceramic having a composition represented by $u(Al_2O_3\text{---}TiO_2)+v(R)+w(3Al_2O_3\text{-}2SiO_2)+x(Al_2O_3)+y(SiO_2)+z(1.1SrO\text{-}1.5Al_2O_3\text{-}13.6SiO_2\text{---}TiO_2)+a(Fe_2O_3\text{---}TiO_2)+b(MgO\text{-}2TiO_2)$, wherein R represents $SrO\text{---}Al_2O_3\text{-}2SiO_2$ or $11.2SrO\text{-}10.9Al_2O_3\text{-}24.1SiO_2\text{---}TiO_2$, $u+v+w+x+y+z+a+b=1$, $0.5<u\leq0.95$, $0.01<v\leq0.5$, $0.01<w\leq0.5$, $0<x\leq0.5$, $0<y\leq0.1$, $0<z\leq0.5$, $0<a\leq0.3$, and $0<b\leq0.3$, which has a low thermal expansion coefficient, high heat shock resistance and high gas permeability, and its Examples show ceramics having thermal expansion coefficients of $0.9 \times 10^{-7}/°C$. to $11 \times 10^{-7}/°C$. The ceramics of JP 2005-534597 A are substantially composed of titanate aluminum, $3Al_2O_3\text{-}2SiO_2$ (mullite), and $SrO\text{---}Al_2O_3\text{-}2SiO_2$, which are obtained by sintering a plasticized mixture comprising inorganic materials comprising silica, alumina, strontium, titania and iron oxide, organic molding aids comprising a plasticizer, a lubricant and a binder, and water. However, because titanate aluminum, $3Al_2O_3\text{-}2SiO_2$ (mullite) and $SrO\text{---}Al_2O_3\text{-}2SiO_2$ are synthesized during a sintering process in the production method, the ceramic suffers large sintering shrinkage, undergoing cracking in the production process. Particularly when large honeycomb structures of 100 mm or more in outer diameter and of 150 mm or more in length for PM-removing filters for diesel engines are produced, cracking due to the sintering shrinkage is a serious problem.

JP 11-114336 A discloses an exhaust gas filter formed by a porous ceramic containing amorphous particles of $Al_2O_3$ and $SiO_2$ between and on aluminum titanate crystal particles, describing that this ceramic has a low sintering shrinkage ratio and good dimensional accuracy. JP 11-114336 A describes that in the sintering of a ceramic material comprising 100 parts by weight of aluminum titanate and 5-20 parts by weight of clay particles, clay particles become amorphous between and on coarse aluminum titanate particles, so that the coarse particles are bonded strongly. However, the use of clay as a starting material makes it difficult to sufficiently lower the sintering shrinkage ratio in the sintering process by the influence of a liquid phase generated from 5-20 parts by weight of clay particles. For instance, this method fails to obtain a sintering shrinkage ratio of less than 10%. Although clay may be effective to aluminum titanate having porosity of 40% or less to some extent, it does not provide honeycomb structures having porosity of 45% or more with sufficiently satisfactory strength and thermal expansion coefficient. Particularly when the porous ceramic is used for large honeycomb structures having outer diameters of 100 mm or more and lengths of 150 mm or more for PM-removing filters for diesel engines, the honeycomb structures do not have sufficiently satisfactory sintering shrinkage ratio, strength and thermal expansion coefficient.

OBJECT OF THE INVENTION

Accordingly, an object of the present invention is to provide a honeycomb structure having crystal phases of aluminum titanate and mullite, which has smaller sintering shrinkage, higher strength and smaller terminal expansion coefficient than those of conventional ones, and its production method.

DISCLOSURE OF THE INVENTION

As a result of intense research in view of the above object, the inventors have found that the addition of mullite powder having a relatively large particle size to a material powder for providing aluminum-titanate-based honeycomb structures provides the honeycomb structures with high strength and low thermal expansion coefficients by introducing large numbers of microcracks while suppressing sintering shrinkage. The present invention has been completed based on such finding.

Thus, the honeycomb structure of the present invention having a crystal phases of aluminum titanate and mullite is obtained by sintering a honeycomb molding made of a mixture comprising titania powder, alumina powder, silica powder and mullite powder, the mixture containing 1-10 parts by mass of silica powder and 5-30 parts by mass of mullite powder per the total amount (100 parts by mass) of the titania powder and the alumina powder, and the mullite powder containing 40-60% by mass of particles having particle sizes of 10-50 μm and 5-30% by mass of particles having particle sizes of 3 μm or less.

The alumina preferably has an average particle size of 0.2-50 μm. The titania preferably has an average particle size of 0.1-10 μm.

The method of the present invention for producing honeycomb structure having crystal phases of aluminum titanate and mullite comprises the step of sintering a honeycomb molding made of mixture comprising titania powder, alumina powder, silica powder and mullite powder, the mixture containing 1-10 parts by mass of silica powder and 5-30 parts by mass of mullite powder per the total amount (100 parts by mass) of the titania powder and the alumina powder, and the mullite powder containing 40-60% by mass of particles having particle sizes of 10-50 μm and 5-30% by mass particles having particle sizes of 3 μm or less.

BRIEF DESCRIPTION OF THE DRAWINGS

FIG. 1(*b*) is a schematic cross-sectional view showing one example of honeycomb filters in parallel with its flow paths.

DESCRIPTION OF THE PREFERRED EMBODIMENTS

[1] Honeycomb Structure

The honeycomb structure is made of a mixture comprising titania powder, alumina powder, silica powder and mullite powder as a main material, the silica powder being 1-10 parts by mass, and the mullite powder being 5-30 parts by mass, per the total amount (100 parts by mass) of the titania powder and alumina powder. The honeycomb structure obtained from such materials has main crystal phases of aluminum titanate and mullite ($3Al_2O_3$—$SiO_2$).

In the case of the sintered aluminum titanate made from titania powder, alumina powder and silica powder as main materials, sintering shrinkage generally occurs at temperatures higher than about 900° C., and aluminum titanate is synthesized at temperatures higher than about 1200° C.

Figure 1A:
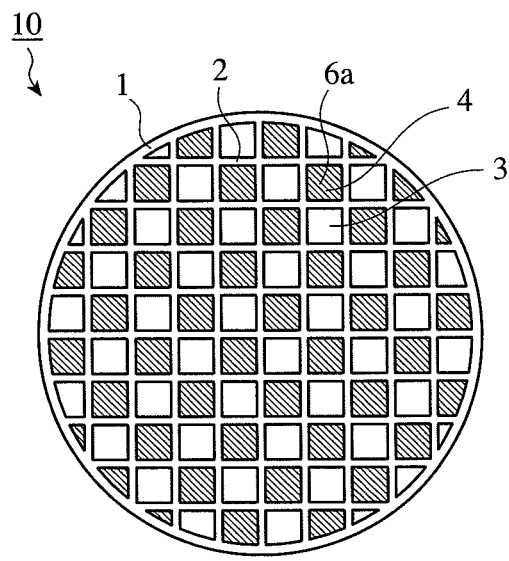
FIG. 1(*a*) is a schematic cross-sectional view showing one example of honeycomb filters perpendicularly to its flow paths.
Figure 1B:
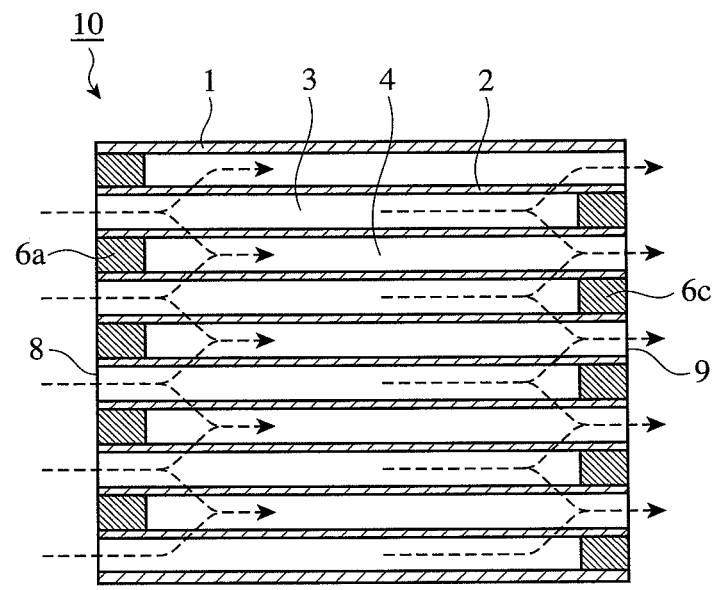
Figure 2:
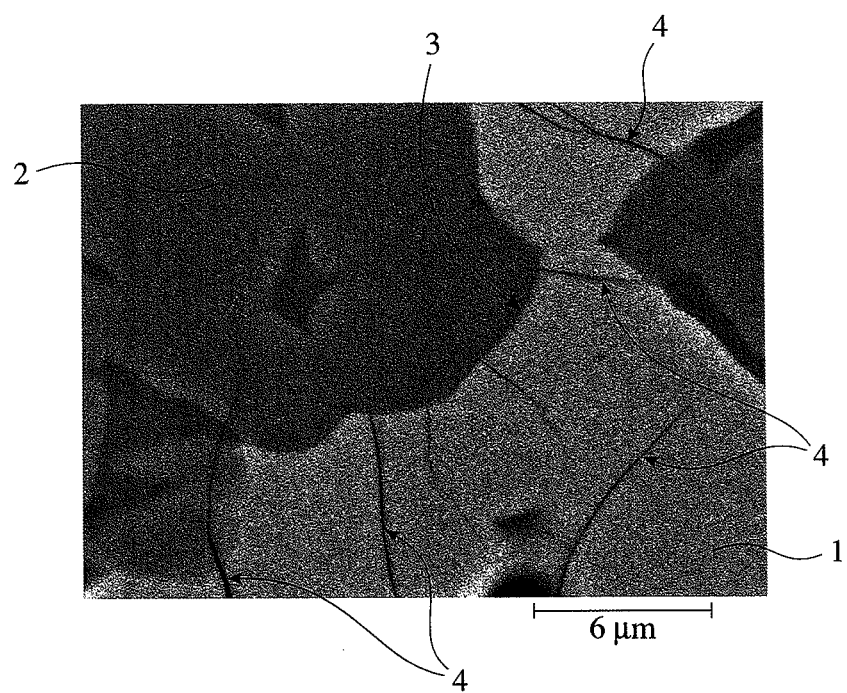
FIG. 2 is a photomicrograph showing microcracks near boundaries between aluminum titanate phases and mullite phases.

The honeycomb structure of the present invention is made of a mixture comprising main materials comprising titania powder, alumina powder and silica powder, and mullite powder having a controlled particle size. The existence of mullite powder having a controlled particle size in the material powder prevents the sintering shrinkage of alumina powder, titania powder, silica powder, and the shrinkage of the synthesized aluminum titanate, thereby suppressing the sintering shrinkage of the honeycomb structure. Further, because the mullite powder having a controlled particle size has a different thermal expansion coefficient from that of aluminum titanate as a main crystal, microcracks 4 are introduced near boundaries 3 between aluminum titanate phases 1 and the mullite phases 2 as shown in FIG. 2. As a result, though mullite has a thermal expansion coefficient of $44 \times 10^{-7}$/° C. to $55 \times 10^{-7}$/° C., the resultant honeycomb structure has as low thermal expansion as $15 \times 10^{-7}$/° C. or less. As described above, mullite has a function to accelerate the generation of microcracks, and a function to prevent the growing of microcracks occurring in aluminum titanate. Thus, the dispersion of a large amount of mullite in the sintered body provides the honeycomb structure with improved strength, thereby providing the honeycomb structure having crystal phases of aluminum titanate and mullite with high strength and low thermal expansion while suppressing sintering shrinkage.

[2] Material for Honeycomb Structure

(1) Titania Powder and Alumina Powder

In the mixture comprising titania powder, alumina powder, silica powder and mullite powder, the titania powder and the alumina powder are substantially in equimolar amounts to form ceramic aluminum titanate crystal suitable for the honeycomb structure. Specifically, the molar ratio of the titania powder to the alumina powder is preferably 45/55 to 55/45, more preferably 48/52 to 52/48, most preferably 50/50.

The alumina powder preferably has an average particle size of 0.2-50 μm. When the average particle size of the alumina powder is less than 0.2 μm, the honeycomb structure suffers large sintering shrinkage. When the average particle size of the alumina powder is more than 50 μm, the honeycomb structure has low strength. The more preferred average particle size of the alumina powder is 4-10 μm. The titania powder preferably has an average particle size of 0.1-10 μm. When the average particle size of the titania powder is less than 0.1 μm, the honeycomb structure suffers large sintering shrinkage. When the average particle size of the titania powder is more than 10 μm, the honeycomb structure has low strength. The more preferred average particle size of the titania powder is 0.5-5 μm.

(2) Silica Powder 1-10 parts by mass of silica powder is added per the total amount (100 parts by mass) of titania powder and alumina powder. Because the silica powder generates a liquid phase in the sintering process, it improves strength, reduces a thermal expansion coefficient, and lowers a sintering temperature. The silica powder is partially dissolved in aluminum titanate to prevent decomposition at 1000-1300° C. Less than 1 part by mass of silica powder fails to improve the strength, and more than 10 parts by mass of silica powder increases the sintering shrinkage ratio of the honeycomb structure. The amount of silica powder added is more preferably 2-6 parts by mass. The silica powder is preferably made of quartz or fused silica obtained by completely melting high-purity silica stones at high temperatures. The silica powder preferably has an average particle size of 2-50 µm. When the average particle size of the silica powder is more than 50 µm, silica particles clog die slits in extrusion molding, for instance, while a moldably plasticized ceramic material passes through die slits as narrow as about 0.3 mm, resulting in honeycomb structures with defected cells. When the silica powder is less than 2 µm, it has too large a specific surface area, needing a large amount of water to form the moldably plasticized ceramic material, thereby reducing the self-supportability of the molding, and generating cracks in the dried cell walls. The more preferred average particle size of the silica powder is 10-30 µm. The silica powder preferably has an aspect ratio of 1-7.

(3) Mullite Powder

Mullite having a relatively large particle size in the honeycomb structure increases the number of microcracks and lowers the thermal expansion coefficient. Particularly mullite powder in which the percentage of particles having particle sizes of 10-50 µm is 40-60% by mass has a large effect of lowering the thermal expansion coefficient. With less than 40% by mass of particles having particle sizes of 10-50 µm, and with a large percentage of particles having particle sizes of less than 10 µm, the honeycomb structure has a large thermal expansion coefficient because of the reduced number of microcracks. With less than 40% by mass of particles having particle sizes of 10-50 µm, and with a large percentage of particles having particle sizes of more than 50 µm, the microcracks are not sufficiently fine as described later, resulting in honeycomb structures with low strength. When the percentage of particles having particle sizes of 10-50 µm exceeds 60% by mass, the honeycomb structure has low strength because there are relatively small percentages of smaller particles effective for improving the strength.

To increase the strength of the honeycomb structure, it is effective to shorten and make finer the microcracks. Because mullite has a function to accelerate the generation of microcracks and to stop their growth as described above, the dispersion of a large amount of mullite having a small particle size in the sintered body increases the strength of the honeycomb structure. The present invention uses mullite powder in which the percentage of particles having particle sizes of 3 µm or less is 5-30% by mass. When the percentage of particles having particle sizes of 3 µm or less is less than 5% by mass, the honeycomb structure has low strength. When the percentage of particles having particle sizes of 3 µm or less is more than 30% by mass, the honeycomb structure has a large thermal expansion coefficient because there are relatively small amounts of particles having particle sizes of 10-50 µm, resulting in the reduced number of microcracks.

The maximum particle size of the mullite powder is preferably 75 µm. When there are particles larger than 75 µm, mullite particles clog die slits in extrusion molding, for instance, while a moldably plasticized ceramic material passes through die slits as narrow as about 0.3 mm, resulting in honeycomb structures with defected cells.

The percentage of the mullite powder is 5-30 parts by mass per the total amount (100 parts by mass) of titania powder and alumina powder. Because mullite per se has a thermal expansion coefficient of $44 \times 10^{-7}/°$ C. to $55 \times 10^{-7}/°$ C., the amount of mullite powder affects the thermal expansion coefficient of the honeycomb structure. When the mullite powder is less than 5 parts by mass, the honeycomb structure has a large sintering shrinkage ratio, resulting in the likelihood of cracking. On the other hand, when the mullite powder is more than 30 parts by mass, the honeycomb structure has a large thermal expansion coefficient. The mullite powder is more preferably 8-20 parts by mass.

(4) Other Compositions

The honeycomb structure may contain a trace amount of a glass phase together with unreacted alumina and titania. Because silica powder is partially dissolved in aluminum titanate as described above, the honeycomb structure is preferably composed of a crystal phases of aluminum titanate and mullite in which silica is substantially dissolved, and the amount of the dissolved silica is preferably 0.1-3% by mass per aluminum titanate. In the production of the honeycomb structure, $Fe_2O_3$, $ZrO_2$, MgO, CaO, etc. may be added as additives for improving the thermal stability of aluminum titanate, together with titania powder, alumina powder, silica powder and mullite powder. Alkali feldspar, strontium feldspar, etc. may also be added as materials for forming a liquid phase, and alkali sources such as alkali oxide and/or strontium sources such as strontium carbonate may be used.

[3] Production Method of Honeycomb Structure

The aluminum-titanate-based honeycomb structure can be produced by forming a honeycomb molding from a mixture (moldable ceramic material) comprising titania powder, alumina powder, silica powder and mullite powder, and sintering it. The mixture comprises 1-10 parts by mass of silica powder and 5-30 parts by mass of mullite powder per the total amount (100 parts by mass) of titania powder and alumina powder, and the mullite powder contains 40-60% by mass of particles having particle sizes of 10-50 µm and 5-30% by mass of particles having particle sizes of 3 µm or less. The use of the mixture having such a composition makes it possible to produce honeycomb structures having main crystals composed of aluminum titanate having low thermal expansion and high strength while suppressing the sintering shrinkage.

The mixture may contain binders such as methylcellulose, and pore-forming materials such as flour, graphite, foamed resin particles, etc. Preferable as the pore-forming materials are foamed resin particles, whose amount is preferably 5-20 parts by mass, more preferably 8-15 parts by mass, per the total amount (100 parts by mass) of titania powder and alumina powder. The use of the foamed resin particles provides a porosity of 50% or more.

The sintering is conducted at 1300-1700° C. When the sintering temperature is lower than 1300° C., aluminum titanate is not sufficiently synthesized. When the sintering temperature is higher than 1700° C., energy is wasted in sintering, undesirable from the aspect of cost. The more preferred sintering temperature is 1400-1600° C. The temperature-keeping time is preferably 5-48 hours. To prevent sintering cracking, the temperature-elevating speed is preferably less than 100° C./hour.

[4] Honeycomb Filter

Plugging the desired flow paths of the honeycomb structure provides a honeycomb filter having a structure in which an exhaust gas passes through cell walls. In order that the cell walls and the plugs have the same thermal expansion coefficient to prevent cracking therebetween, the plugs preferably have a crystal phases of aluminum titanate and mullite like the cell walls.

The present invention will be explained in further detail by Examples below without intention of restricting the present invention thereto.

Example 1

Rutile titania powder (average particle size: 1 µm, purity: 99.4%) and alumina powder (average particle size: 6 µm, purity: 99.7%) were mixed at a molar ratio (titania/alumina) of 50/50, and 100 parts by mass of the resultant mixed powder was mixed with 3 parts by mass of silica powder (average particle size: 20 µm, purity: 99.8%), and 10 parts by mass of mullite powder, which contained 50% by mass of particles having particle sizes of 10-50 µm, 20% by mass of particles having particle sizes of 3 µm or less, and 0.5% by mass of particles having particle sizes of more than 50 µm, and had the maximum particle size of less than 75 µm, and purity of 99.2%. The particle size of the above powder was measured by a laser diffraction particle size distribution analyzer.

With the total amount of titania powder and alumina powder as 100 parts by mass, this mixed powder was mixed with 12 parts by mass of organic foams, and 8 parts by mass of methylcellulose as a binder, and then blended with water to form a moldably plasticized ceramic material. This moldable ceramic material was extruded through a die, cut, and dried to form a molding having a honeycomb structure. This molding had an outer diameter of 50 mm, a length of 130 mm, a cell wall thickness of 0.25 mm, and a cell wall pitch of 1.4 mm. This molding was sintered at 1600° C. for 5 hours to obtain a honeycomb structure comprising aluminum titanate and mullite as main crystals.

From the lengths of the honeycomb structure in the flow path direction before and after sintering, the shrinkage ratio [=(the length of honeycomb structure before sintering–the length of sintered honeycomb structure)/the length of honeycomb structure before sintering] was determined. The porosity, strength and thermal expansion coefficient (CTE) of the sintered honeycomb structures were then measured. The porosity was measured by mercury porosimetry. A test piece (10 mm×10 mm×10 mm) cut out of each honeycomb structure was put in a measurement cell of Autopore III available from Micromeritics, and the measurement cell was evacuated and pressurized by introducing mercury. From the relation of the pressure and the volume of mercury intruded into pores in the test piece, the relation of a pore diameter and a cumulative pore volume was determined. The mercury-introducing pressure was 0.5 psi ($0.35 \times 10^{-3}$ kgf/mm$^2$), and the pore diameter was calculated from the pressure using a contact angle of 130°, and a surface tension of 484 dyne/cm. The A-axis compression strength was measured according to Standard M505-87 of JASO. The thermal expansion coefficient (CTE) was measured by a thermomechanical analyzer (TMA), and averaged between 40° C. and 800° C.

Examples 2-7 and Comparative Examples 1-6

The honeycomb structures of Examples 2-7 and Comparative Examples 1-6 were produced in the same manner as in Example 1 except for changing the particle size distribution and amount of mullite powder as shown in Table 1.

Examples 8-11

The honeycomb structures of Examples 8-11 were produced in the same manner as in Example 1 except for changing the average particle sizes of alumina powder and titania powder as shown in Table 1.

Examples 12-14, and Comparative Examples 7 and 8

The honeycomb structures of Examples 12-14 and Comparative Examples 7 and 8 were produced in the same manner as in Example 1 except for changing the amount of silica powder as shown in Table 1.

The honeycomb structures of Examples 1-14 and Comparative Examples 1-8 were evaluated with respect to porosity, CTE, strength and shrinkage ratio according to the following standards. The results are shown in Table 1.

The evaluation standard of CTE
Excellent: CTE was less than $10 \times 10^{-7}$/° C.
Good: CTE was $10 \times 10^{-7}$/° C. to $15 \times 10^{-7}$/° C.
Poor: CTE was more than $15 \times 10^{-7}$/° C.

The evaluation standard of strength
Excellent: The A-axis compression strength was more than 5 MPa.
Good: The A-axis compression strength was 2-5 MPa.
Poor: The A-axis compression strength was less than 2 MPa.

The evaluation standard of shrinkage ratio
Excellent: The shrinkage ratio was less than 3%.
Good: The shrinkage ratio was 3-10%.
Poor: The shrinkage ratio was more than 10%.

TABLE 1

| No. | Average Particle Size (µm) | |
| --- | --- | --- |
| | Titania Powder | Alumina Powder |
| Example 1 | 1 | 6 |
| Example 2 | 1 | 6 |
| Example 3 | 1 | 6 |
| Example 4 | 1 | 6 |
| Example 5 | 1 | 6 |
| Example 6 | 1 | 6 |
| Example 7 | 1 | 6 |
| Example 8 | 0.1 | 2 |
| Example 9 | 0.05 | 1 |
| Example 10 | 5 | 11 |
| Example 11 | 10 | 30 |
| Example 12 | 1 | 6 |
| Example 13 | 1 | 6 |
| Example 14 | 1 | 6 |
| Comparative Example 1 | 1 | 6 |
| Comparative Example 2 | 1 | 6 |
| Comparative Example 3 | 1 | 6 |
| Comparative Example 4 | 1 | 6 |
| Comparative Example 5 | 1 | 6 |
| Comparative Example 6 | 1 | 6 |
| Comparative Example 7 | 1 | 6 |
| Comparative Example 8 | 1 | 6 |

TABLE 1-continued

| No. | Amount[1] (parts by mass) | | Particle Size Distribution[2] of Mullite (% by mass) | | |
|---|---|---|---|---|---|
| | Silica | Mullite | ≤3 μm | 10-50 μm | >50 μm |
| Example 1 | 3 | 10 | 20 | 50 | 0.5 |
| Example 2 | 3 | 10 | 30 | 40 | 0 |
| Example 3 | 3 | 10 | 5 | 40 | 20 |
| Example 4 | 3 | 10 | 5 | 59 | 15.5 |
| Example 5 | 3 | 5 | 20 | 53 | 0.5 |
| Example 6 | 3 | 20 | 20 | 53 | 0.5 |
| Example 7 | 3 | 30 | 20 | 53 | 0.5 |
| Example 8 | 3 | 10 | 20 | 53 | 0.5 |
| Example 9 | 3 | 10 | 20 | 53 | 0.5 |
| Example 10 | 3 | 10 | 20 | 53 | 0.5 |
| Example 11 | 3 | 10 | 20 | 53 | 0.5 |
| Example 12 | 1 | 10 | 20 | 53 | 0.5 |
| Example 13 | 5 | 10 | 20 | 53 | 0.5 |
| Example 14 | 8 | 10 | 20 | 53 | 0.5 |
| Comparative Example 1 | 3 | 10 | 30 | 30 | 0 |
| Comparative Example 2 | 3 | 10 | 4 | 35 | 50 |
| Comparative Example 3 | 3 | 10 | 5 | 65 | 15.5 |
| Comparative Example 4 | 3 | 10 | 35 | 40 | 0 |
| Comparative Example 5 | 3 | 3 | 20 | 53 | 0.5 |
| Comparative Example 6 | 3 | 35 | 20 | 53 | 0.5 |
| Comparative Example 7 | 0.5 | 10 | 20 | 53 | 0.5 |
| Comparative Example 8 | 12 | 10 | 20 | 53 | 0.5 |

| No. | Porosity (%) | CTE | Strength | Shrinkage Ratio |
|---|---|---|---|---|
| Example 1 | 50 | Excellent | Excellent | Excellent |
| Example 2 | 51 | Good | Excellent | Excellent |
| Example 3 | 50 | Excellent | Good | Excellent |
| Example 4 | 51 | Excellent | Good | Excellent |
| Example 5 | 49 | Good | Good | Good |
| Example 6 | 50 | Good | Excellent | Excellent |
| Example 7 | 52 | Good | Excellent | Excellent |
| Example 8 | 48 | Excellent | Excellent | Good |
| Example 9 | 47 | Excellent | Excellent | Good |
| Example 10 | 54 | Excellent | Excellent | Excellent |
| Example 11 | 55 | Excellent | Good | Excellent |
| Example 12 | 52 | Good | Good | Excellent |
| Example 13 | 50 | Excellent | Excellent | Excellent |
| Example 14 | 49 | Good | Excellent | Good |
| Comparative Example 1 | 51 | Poor | Excellent | Excellent |
| Comparative Example 2 | 52 | Excellent | Poor | Excellent |
| Comparative Example 3 | 51 | Excellent | Poor | Excellent |
| Comparative Example 4 | 53 | Poor | Excellent | Excellent |
| Comparative Example 5 | 52 | Good | Poor | Poor |
| Comparative Example 6 | 52 | Poor | Excellent | Excellent |
| Comparative Example 7 | 52 | Good | Poor | Excellent |
| Comparative Example 8 | 48 | Good | Excellent | Poor |

Note:
[1]The amounts of silica and mullite are expressed by parts by mass per 100 parts by mass of titania powder plus alumina powder.
[1]All mullite powder had the maximum particle size of less than 75 μm.

It is clear from Table 1 that the honeycomb structures of the present invention in Examples 1-14 had small sintering shrinkage, high strength and low thermal expansion coefficients.

Effect of the Invention

Because the titanate-aluminum-based honeycomb structures of the present invention have smaller sintering shrinkage than that of conventional ones, they have high strength and low thermal expansion coefficients without suffering sintering cracking. Accordingly, they are suitable particularly for large honeycomb filters for removing PM from diesel engine exhausts. The method of the present invention can produce the above titanate-aluminum-based honeycomb structures.

What is claimed is:

1. A honeycomb structure obtained by sintering a honeycomb molding made of a mixture comprising titania powder, alumina powder, silica powder and mullite powder, said mixture containing 1-10 parts by mass of silica powder and 5-30 parts by mass of mullite powder per the total amount (100 parts by mass) of said titania powder and said alumina powder, and said mullite powder having a maximum particle size of 75 μm or less and containing 40-60% by mass of particles having particle sizes of 10-50 μm and 5-30% by mass of particles having particle sizes of 3 μm or less, wherein the honeycomb structure has main crystal phases of aluminum titanate and mullite, which said aluminum titanate is silica-aluminum titanate solid solution.

2. The honeycomb structure according to claim 1, wherein said alumina has an average particle size of 0.2-50 μm.

3. The honeycomb structure according to claim 1, wherein said titania has an average particle size of 0.1-10 μm.

4. A method for producing a honeycomb structure having crystal phases composed of aluminum titanate and mullite, where the aluminum titanate is silica-aluminum titanate solid solution, comprising the step of sintering a honeycomb molding made of a mixture comprising titania powder, alumina powder, silica powder and mullite powder, said mixture containing 1-10 parts by mass of silica powder and 5-30 parts by mass of mullite powder per the total amount (100 parts by mass) of said titania powder and said alumina powder, and said mullite powder having a maximum particle size of 75 μm or less and containing 40-60% by mass of particles having particle sizes of 10-50 μm and 5-30% by mass of particles having particle sizes of 3 μm or less, wherein the honeycomb structure has main crystal phases of aluminum titanate and mullite, which said aluminum titanate is silica-aluminum titanate solid solution.

5. The honeycomb structure according to claim 2, wherein said titania has an average size of 0.1-10 μm.

6. The honeycomb structure according to claim 1, wherein said silica is partially dissolved in the crystalline aluminum titanate during sintering.

* * * * *